United States Patent
Takeoka et al.

(10) Patent No.: US 9,336,475 B2
(45) Date of Patent: May 10, 2016

(54) RADIO IC DEVICE AND RADIO COMMUNICATION TERMINAL

(71) Applicant: Murata Manufacturing Co., Ltd., Nagaokakyo-shi, Kyoto-fu (JP)

(72) Inventors: Makoto Takeoka, Nagaokakyo (JP); Yuya Dokai, Nagaokakyo (JP); Hiromi Murayama, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/337,547

(22) Filed: Jul. 22, 2014

(65) Prior Publication Data

US 2014/0332594 A1 Nov. 13, 2014

Related U.S. Application Data

(63) Continuation of application No. PCT/JP2013/055618, filed on Mar. 1, 2013.

(30) Foreign Application Priority Data

Apr. 25, 2012 (JP) .................................. 2012-099838

(51) Int. Cl.
| | |
|---|---|
| *G06K 19/00* | (2006.01) |
| *G06K 19/07* | (2006.01) |
| *H01Q 1/22* | (2006.01) |
| *H01Q 23/00* | (2006.01) |
| *G06K 19/077* | (2006.01) |

(52) U.S. Cl.
CPC ...... *G06K 19/0726* (2013.01); *G06K 19/07777* (2013.01); *H01Q 1/2225* (2013.01); *H01Q 23/00* (2013.01)

(58) Field of Classification Search
USPC ............ 235/435, 439, 451, 487, 492; 340/10, 340/572
See application file for complete search history.

(56) References Cited

U.S. PATENT DOCUMENTS

| | | | |
|---|---|---|---|
| 6,972,662 B1 | 12/2005 | Ohkawa et al. | |
| 2002/0190907 A1* | 12/2002 | Konishi | ................... H01Q 1/38 343/702 |

(Continued)

FOREIGN PATENT DOCUMENTS

| | | |
|---|---|---|
| EP | 2 166 618 A1 | 3/2010 |
| JP | 5-258127 A | 10/1993 |

(Continued)

OTHER PUBLICATIONS

Official Communication issued in corresponding Japanese Patent Application No. 2014-512398, mailed on Jun. 17, 2014.

(Continued)

*Primary Examiner* — Matthew Mikels
(74) *Attorney, Agent, or Firm* — Keating & Bennett, LLP (57) ABSTRACT

A radio IC device includes a radio IC element that includes an antenna terminal connected to an antenna element, and a ground terminal connected to a ground conductor provided integrally with the antenna element, and a circuit element that includes an impedance matching circuit connected to the antenna terminal of the radio IC element. The circuit element includes a first inductance element that defines the impedance matching circuit, and a second inductance element that is connected, as a high-frequency cutoff circuit for the radio IC element, to the ground terminal.

20 Claims, 7 Drawing Sheets

(56) References Cited

U.S. PATENT DOCUMENTS

| | | |
|---|---|---|
| 2005/0094463 A1 | 5/2005 | Nishizawa et al. |
| 2005/0231439 A1 | 10/2005 | Suwa et al. |
| 2010/0308118 A1 | 12/2010 | Kataya et al. |
| 2010/0321110 A1* | 12/2010 | Ichitsubo et al. ............. 330/144 |
| 2012/0086556 A1 | 4/2012 | Ikemoto |

FOREIGN PATENT DOCUMENTS

| | | |
|---|---|---|
| JP | 2001-250097 A | 9/2001 |
| JP | 2002-330082 A | 11/2002 |
| JP | 2005-303940 A | 10/2005 |
| JP | 2006-195796 A | 7/2006 |
| JP | 2007-41629 A | 2/2007 |
| JP | 2007-58381 A | 3/2007 |
| JP | 2009-260758 A | 11/2009 |
| JP | 4535209 B2 | 9/2010 |
| JP | 2011-48600 A | 3/2011 |
| JP | 2011-86009 A | 4/2011 |
| JP | 2011-239340 A | 11/2011 |
| WO | 2009/005080 A1 | 1/2009 |
| WO | 2011/055702 A1 | 5/2011 |

OTHER PUBLICATIONS

Official Communication issued in International Patent Application No. PCT/JP2013/055618, mailed on May 28, 2013.
Official Communication issued in corresponding Japanese Patent Application No. 2014-163515, mailed on Jul. 14, 2015.

* cited by examiner

RADIO IC DEVICE AND RADIO COMMUNICATION TERMINAL

BACKGROUND OF THE INVENTION

1. Field of the Invention

The present invention relates to a radio IC device and a radio communication terminal, and more particularly, to a radio IC device preferably for use in an RFID (Radio Frequency Identification) system and a radio communication terminal which includes the radio IC device.

2. Description of the Related Art

In recent years, as an information management system for articles, an RFID system has been put into practical use, in which a reader/writer that generates an induction field communicates with an RFID tag (also called a radio IC device) attached to an article, using a non-contact method which utilizes an electromagnetic field, so that transmission of specific information is carried out. For example, a radio IC device mounted on a substrate of an electronic apparatus, such as a radio communication terminal, has been used for information management of the substrate and body of the electronic apparatus.

Recently, in particular, a dual-interface communication IC mounting a digital interface for wired communication, as well as an RF interface for radio communication, has been developed and attracted attention, as a radio IC chip that stores specific information and processes a specific radio signal.

In an RFID system utilized for managing a substrate of an electronic apparatus such as a portable terminal, using, as an antenna of a radio IC device, a ground conductor of a printed board built in the apparatus is described, for example, in Japanese Patent No. 4535209. The use of the ground conductor as an antenna eliminates the necessity of a dedicated antenna. Therefore, the size of the electronic apparatus may be reduced, and a gain in a radiation plate (ground conductor) that functions as an antenna may be improved.

However, in the dual-interface communication IC mentioned above, when the ground conductor of the apparatus body is also used as an antenna, the fact that the ground conductor also serves as a reference potential for the digital interface will affect communication characteristics of the RFID system (for example, the frequency characteristics vary and the reading distance decreases). Further, in the digital interface, because of the presence of a circuit which is not isolated from the ground conductor in terms of high frequencies, the communication characteristics may be affected depending on the connection status of such a circuit.

SUMMARY OF THE INVENTION

Preferred embodiments of the present invention provide a radio IC device and a radio communication terminal which do not cause adverse effects on communication characteristics of an antenna.

A radio IC device according to a first aspect of a preferred embodiment of the present invention includes a radio IC element that includes an antenna terminal connected to an antenna element, and a ground terminal connected to a ground conductor provided integrally with the antenna element; and a circuit element that includes an impedance matching circuit connected to the antenna terminal of the radio IC element. The circuit element includes a first inductance element that defines the impedance matching circuit, and a second inductance element that is connected, as a high-frequency cutoff circuit for the radio IC element, to the ground terminal.

A radio IC device according to a second aspect of a preferred embodiment of the present invention includes a radio IC element that includes an antenna terminal connected to an antenna element, and a wired connection terminal connected to a different IC element by wire; and a circuit element that includes an impedance matching circuit connected to the antenna terminal of the radio IC element. The circuit element includes a first inductance element that defines the impedance matching circuit, and a second inductance element that is connected, as a high-frequency cutoff circuit for the radio IC element, to the wired connection terminal. The different IC element is connected to a ground conductor provided integrally with the antenna element.

A radio communication terminal according to a third aspect of a preferred embodiment of the present invention includes a radio IC device; and a mother board that includes a ground conductor provided integrally with an antenna element. The radio IC device includes a radio IC element that includes an antenna terminal connected to the antenna element and a wired connection terminal connected to a different IC element by wire, and a circuit element that includes an impedance matching circuit connected to the antenna terminal of the radio IC element. The circuit element includes a first inductance element that defines the impedance matching circuit, and a second inductance element that is connected, as a high-frequency cutoff circuit for the radio IC element, to the wired connection terminal.

Regarding the above-mentioned radio IC device and radio communication terminal, the circuit element that includes the impedance matching circuit connected to the radio IC element, includes the second inductance element, which is connected as the high-frequency cutoff circuit for the radio IC element. Therefore, even in the case where the ground conductor of the radio IC device is also used as the antenna of the radio IC element, interference between the antenna element and the ground conduction which functions as a reference potential of the radio IC device is significantly reduced, minimized, or substantially eliminated, causing no adverse effects on communication characteristics of the RFID system.

According to various preferred embodiments of the present invention, adverse effects on communication characteristics of an antenna are significantly reduced, minimized, or substantially eliminated.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Radio IC devices and radio communication terminals according to various preferred embodiments of the present invention will be described hereinafter with reference to the accompanying figures. In individual figures, common components and elements are denoted by the same signs, and redundant explanations will be omitted.

Figure 1:
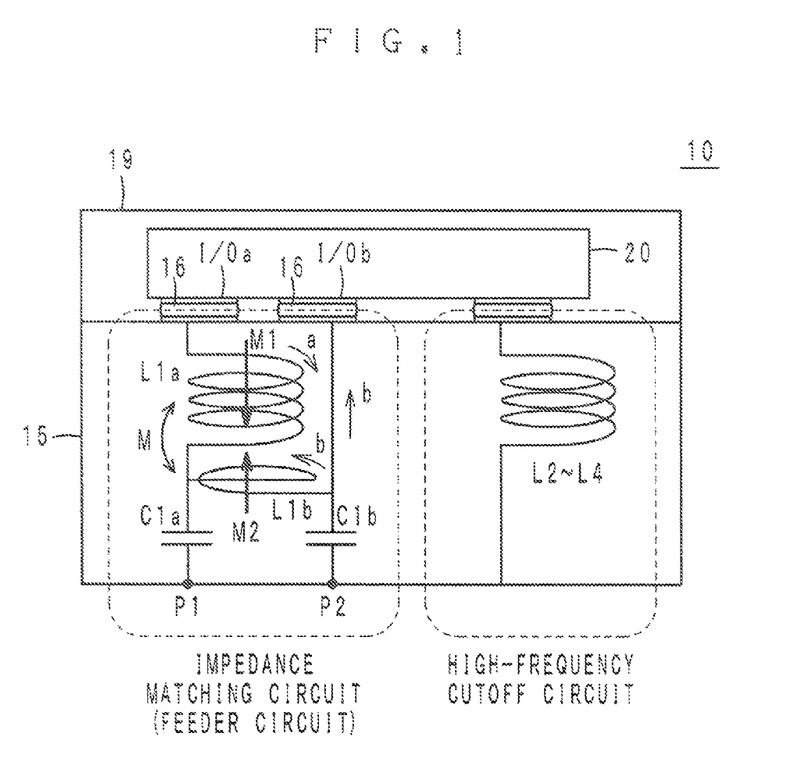
FIG. 1 is a section view illustrating a radio IC device according to a preferred embodiment of the present invention along with an equivalent circuit.
Figure 4:
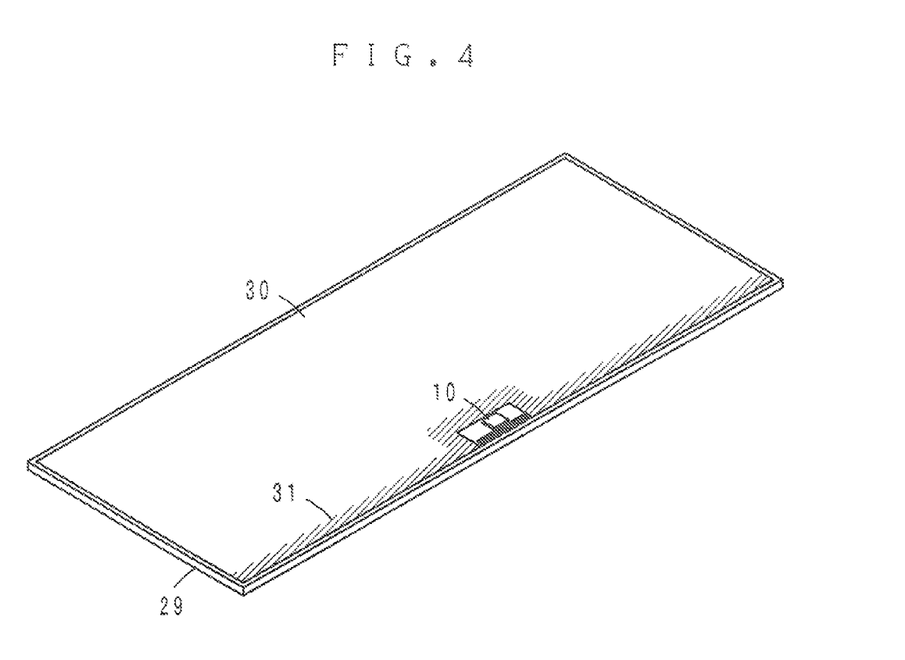
FIG. 4 is a perspective view illustrating a ground conductor that also defines and serves as an antenna, provided on a mother board of the radio communication terminal.
Figure 5:
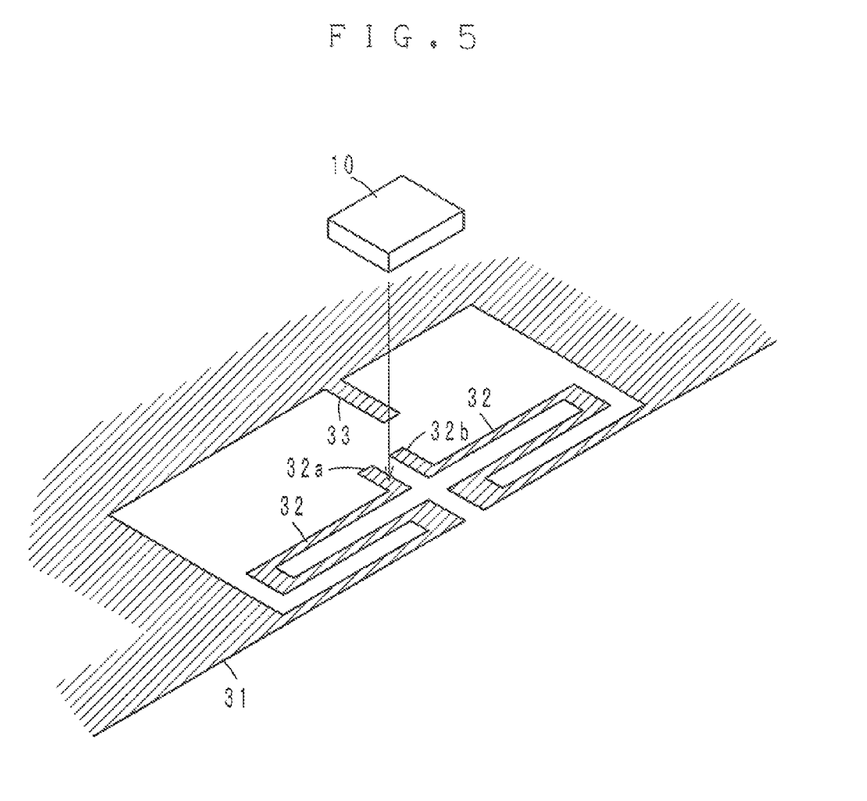
FIG. 5 is a perspective view illustrating a main portion of the ground conductor that also serves as an antenna.

A radio IC device 10 according to a preferred embodiment is preferably configured for communication in the UHF band in an RFID system, for example. As illustrated in FIG. 1, the radio IC device 10 includes a circuit element (circuit board 15) preferably configured as a multilayer body and a radio IC element (radio IC chip 20) mounted on the circuit element, and is sealed with a resin material 19. A portion of a ground conductor 30 illustrated in FIG. 4 is used as an RFID antenna of the radio IC chip 20. An antenna element 31 of the ground conductor 30 which is used as an antenna is indicated by oblique lines in FIG. 4 and FIG. 5. In the antenna element 31, an impedance matching line 32 is provided. The impedance matching line 32 is represented as an inductor L in FIG. 3.

Figure 2:
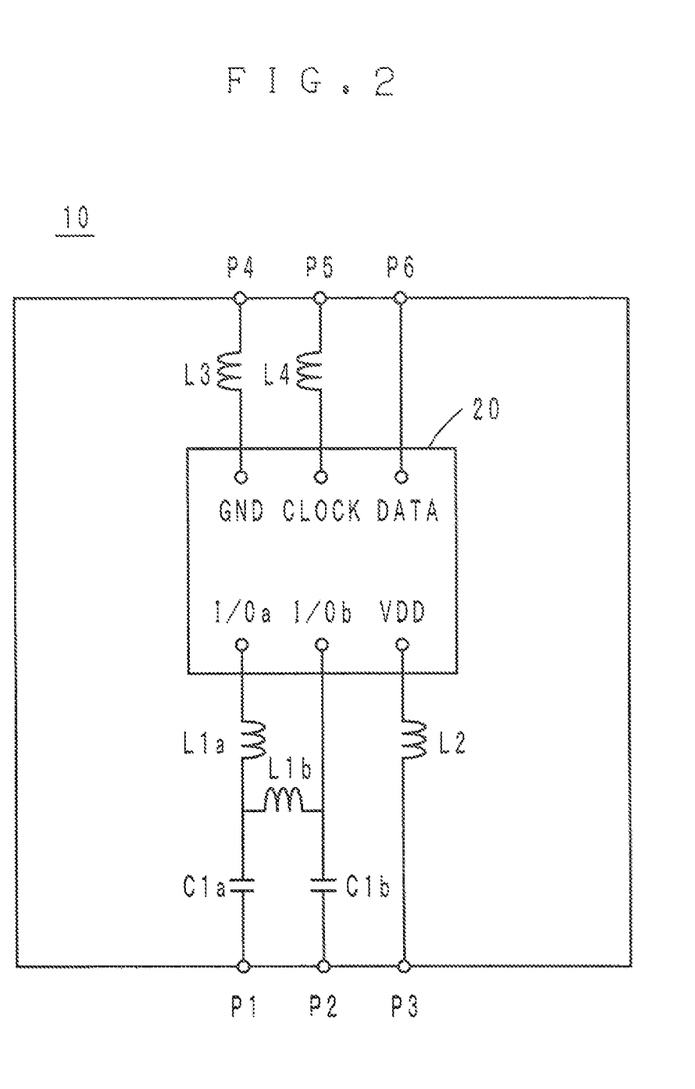
FIG. 2 is a circuit diagram of the radio IC device.
Figure 3:
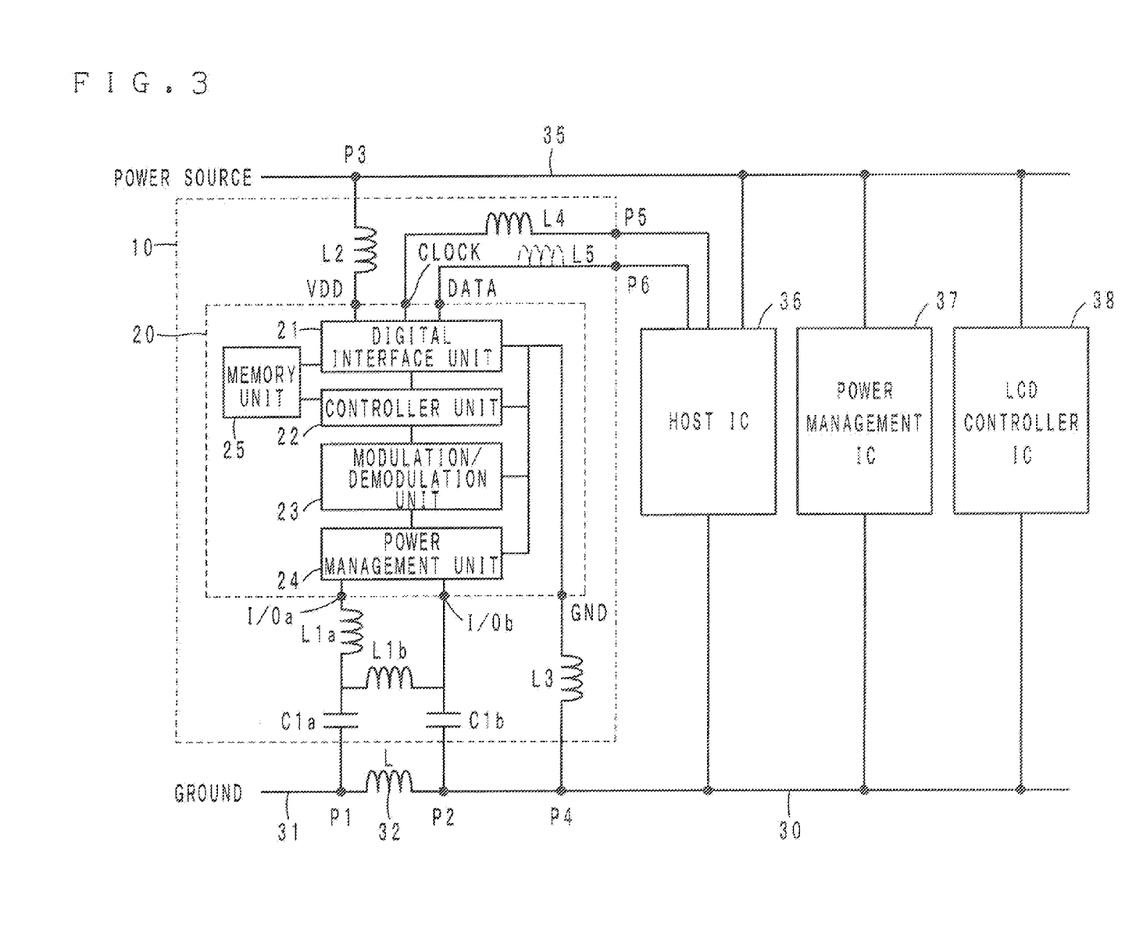
FIG. 3 is a block diagram illustrating an electric circuit of a radio communication terminal including the radio IC device.

The radio IC chip 20 preferably is, as illustrated in FIG. 3, an integrated circuit element which includes an digital interface unit 21, a controller unit 22, a modulation/demodulation unit 23, a power management unit 24, and a memory unit 25, and processes an RF signal. The integrated circuit element is a dual-interface IC including an RF interface for radio communication and a wired interface for wired communication. The radio IC chip 20 preferably includes a semiconductor substrate as a base, which is made from silicon or the like. However, the radio IC chip 20 may be a bare chip IC or a package IC, for example. As illustrated in FIG. 2 and FIG. 3, the circuit board 15 includes a power supply electrode VDD, a clock electrode CLOCK, a data electrode DATA, a ground electrode GND, and differential input/output electrodes I/Oa and I/Ob.

The circuit board 15 preferably is a multilayer body including a plurality of stacked substrate layers 41a to 41j (see FIG. 6), which includes therein a matching circuit configured to achieve impedance matching between the radio IC chip 20 and the antenna element 31, and inductance elements L2, L3, and L4 which define a high-frequency cutoff circuit for the radio IC chip 20. The matching circuit includes an inductance element L1a which is connected in series to the radio IC chip 20, and an inductance element L1b which is connected in parallel to the radio IC chip 20. One end of the inductance element L1a is connected to the input/output electrode I/Oa via conductive bonding materials 16 such as solder, for example. The other end of the inductance element L1a is connected to an electrode P1 via a capacitor element C1a, and the electrode P1 is connected to a one end portion 32a (see FIG. 5) of the impedance matching line 32.

One end of the inductance element L1b is connected to the other end of the inductance element L1a and to the capacitor element C1a. The other end of the inductance element L1b is connected to the input/output electrode I/Ob via the conductive bonding materials 16. The other end of the inductance element L1b is also connected to an electrode P2 via a capacitor element C1b, and the electrode P2 is connected to a one end portion 32b (see FIG. 5) of the impedance matching line 32. In other words, the inductance element L1a is connected in series to a differential signal line, and the inductance element L1b is provided between the differential signal lines.

An electrode P4 (connected to the inductance element L3) located on the back side of the circuit board 15 is connected to a line 33 of the ground conductor 30.

As illustrated in FIG. 1, the inductance elements L1a and L1b are wound and positioned such that their respective winding axes are on the same or approximately the same axis and such that the directions of magnetic fields M1 and M2 respectively generated at the inductance elements L1a and L1b are opposite to each other. Specifically, the inductance elements L1a and L1b are arranged inside the multilayer body such that their winding axes extend in a direction along the laminating direction of the circuit board 15. That is, the direction of the magnetic field M1 generated by a current a at the inductance element L1a and the direction of the magnetic field M2 generated by a current b at the inductance element L1b are facing each other. Further, the inductance elements L1a and L1b are, as indicated by a sign M, coupled magnetically, and the capacitor elements C1a and C1b define a resonant circuit. The resonant circuit also defines and functions as a feeder circuit for the radio IC chip 20.

The inductance element L1a is a series inductance component on the radio IC chip 20 side, and the inductance component of the inductance element L1a is configured to perform a main function of moving an impedance in the direction of an imaginary number axis on an impedance chart. On the other hand, the inductance element L1b is a series inductance component on the antenna element 31 side, extends over two connection portions of the antenna element 31, and is configured to perform a main function of moving an impedance on an imaginary number axis on an admittance chart. Accordingly, with the use of the two types of inductance elements L1a and L1b configured to perform the above functions, efficient impedance matching is achieved.

Further, the circuit board 15 includes therein the second inductance elements L2, L3 and L4. The inductance element L2 is provided between the power supply electrode VDD and an electrode P3 which is connected to a power supply line 35. The inductance element L3 is provided between the ground electrode GND and the electrode P4 which is connected to the ground conductor 30. The inductance element L4 is provided between the clock electrode CLOCK and an electrode P5 which is connected to a host IC 36. Further, an inductance element L5 preferably is provided between the data electrode DATA and an electrode P6 which is connected to the host IC 36.

As illustrated in FIG. 3, a radio communication terminal (typically, a cellular phone) includes, in addition to the radio IC device 10 that includes the radio IC chip 20, the matching circuit, and the inductance elements L2 to L4, the power supply line 35 provided on a mother board 29 (see FIG. 4), the ground conductor 30 that also defines and functions as an antenna, the host IC 36, a power management IC 37, and an LCD controller IC 38. The ICs 36, 37, and 38 are connected to the power supply line 35 and the ground conductor 30 that also defines and functions as an antenna. Thermoplastic resin materials such as polyimide or PET may be suitably used for the mother board 29. The ground conductor 30 is preferably defined by a metal film containing silver, copper, or aluminum as a main component, which is provided almost over the whole surface of the mother board 29.

In the radio IC device 10, a specific high-frequency signal is transmitted from the radio IC chip 20 to the antenna element 31 via the matching circuit, and is emitted outside as a carrier signal having a specific carrier frequency. Similarly, when the antenna element 31 receives a carrier signal from outside, electric power is supplied to the radio IC chip 20 via the matching circuit. Accordingly, the radio IC chip 20 and a reader/writer, which is not illustrated, communicate with each other. That is, the radio IC chip 20 includes the antenna terminals (I/Oa and I/Ob) connected to the antenna element 31, and the wired connection terminals (VDD, CLOCK, DATA, and GND) connected via wire to the other IC elements (36, 37 and 38).

In the radio IC device 10, the inductance elements L1a and L1b are wound and positioned such that their respective winding axes are approximately on the same axis and such that the directions of the magnetic fields M1 and M2, which are respectively generated at the inductance elements L1a and L1b, are opposite to each other. Therefore, the inductance elements L1a and L1b are coupled magnetically, generating a plurality of resonance points, which allows transmission and reception of a high-frequency signal in a wide frequency range. In addition, due to the small number of elements, the size of the circuit board 15 is significantly reduced, thus reducing the size of the radio IC device 10 itself.

In the radio IC device 10, the inductance elements L2, L3, and L4 are provided, as a high-frequency cutoff circuit for the radio IC element 20, on the circuit board 15 that includes the impedance matching circuit which is connected to the radio IC chip 20. Therefore, even when the ground conductor 30 of the radio IC device 10 is also used as the antenna of the radio IC chip 20, there will be no or substantially no interference between the antenna element 31 and the ground conductor 30 which defines and functions as a reference potential of the radio IC device 10. Accordingly, no or substantially no adverse effects are exerted on the communication characteristics of the RFID system. The high-frequency cutoff circuit is provided to attenuate noise current from a power supply circuit, a ground, or a clock circuit, and shortcut current of a carrier signal.

Figure 7:
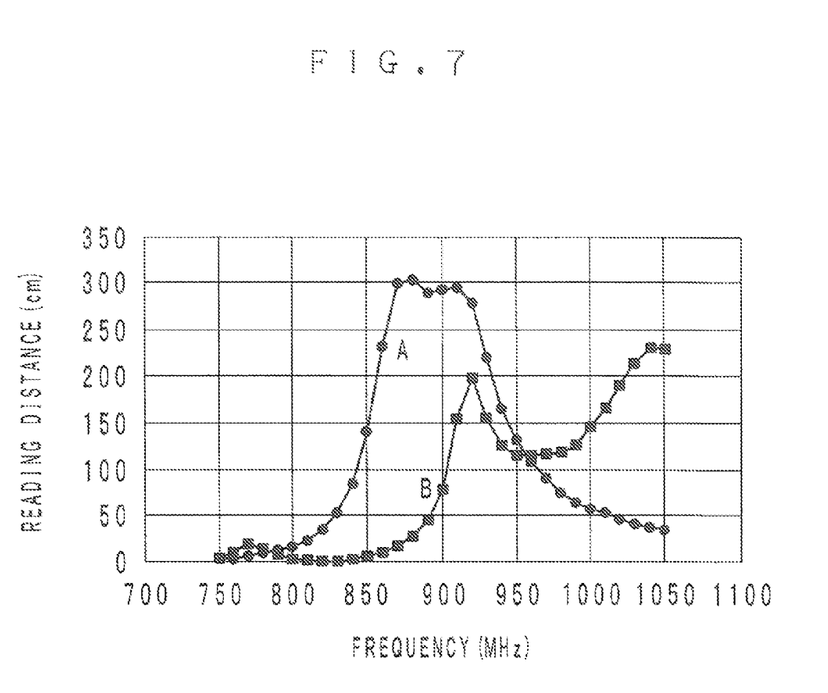
FIG. 7 is a graph illustrating communication characteristics of the radio IC device.

In FIG. 7, a curve A represents a change in the reading distance between the radio IC device 10 and a reader/writer. The radio IC device 10 preferably is configured to operate within a range from about 860 MHz to about 910 MHz, for example. The ground conductor 30 that also defines and serves as an antenna preferably measures about 100 mm by about 40 mm, and the mother board 29 preferably is about 1 mm thick, for example. In FIG. 7, a curve B represents, as a comparative example, a change in the reading distance in the case where a radio IC device does not include the inductance elements L2, L3, and L4 (the other features of the configuration are the same as those of the radio IC device 10).

In the comparative example mentioned above, electromagnetic interference occurs between the antenna element 31 and the ground conductor 30, the peak frequency is shifted toward higher frequencies, and the reading distance is reduced. In contrast, in the case of the radio IC device 10, since it is possible to prevent a carrier signal from returning to the radio IC chip 20 from a terminal other than the antenna terminal, substantially the same peak frequency as a designed value is maintained, and a reduction in the reading distance is hardly generated.

It is preferable that the inductance elements L1a and L1b that define the matching circuit and the inductance elements L2, L3, and L4 that define the high-frequency cutoff circuit are not coupled electromagnetically or that the degree of coupling is small. This is because if those inductance elements are coupled, noise current or shortcut current which should be essentially cut off may come into the radio IC chip 20 through the matching circuit. In order to prevent coupling from occurring, when the inductance elements are each defined by a coil, it is preferable that coil-winding axes of the coils are arranged in different positions or the coil-winding axes do not overlap in a plan view in the circuit board 15.

Further, electromagnetic coupling is prevented by using closed-magnetic-path-type inductance elements L1a and L1b and/or closed-magnetic-path-type inductance elements L2, L3, and L4 and arranging the inductance elements away from the closed magnetic path. In the case where the line of the inductance elements L2, L3 and L4 needs to be long in order to attain desired high-frequency cutoff characteristics, it is desirable to provide a closed magnetic path using the inductance elements L2, L3 and L4. When wires of the circuit board 15 intersect with each other due to the positional relationship of the electrodes of the radio IC device 10 and the radio IC chip 20, the inductance elements may be positioned by keeping away from an area where the magnetic field is the strongest.

Figure 6:
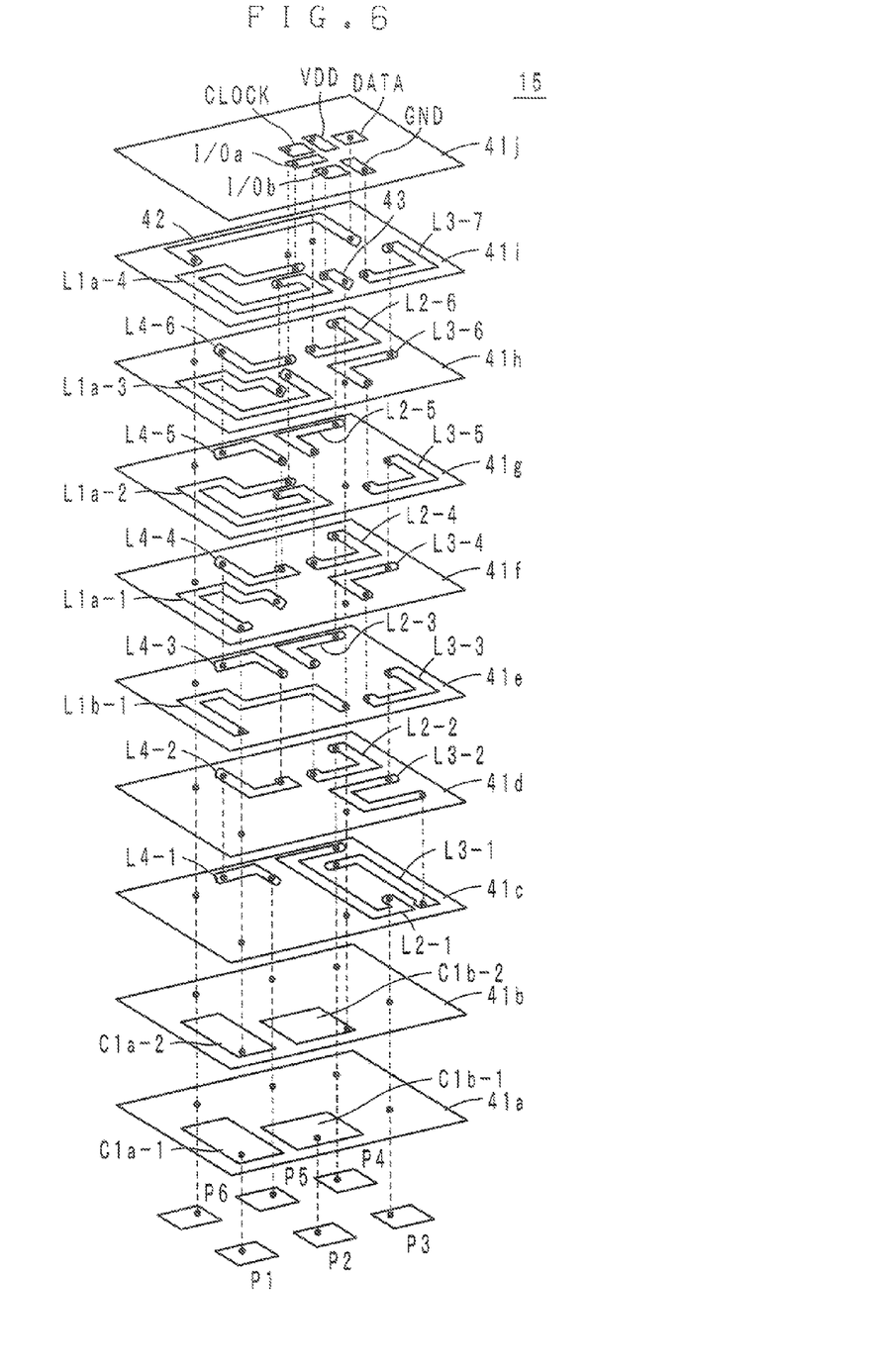
FIG. 6 is an exploded perspective view illustrating a circuit board of the radio IC device.

A multilayer structure of the circuit board 15 will be described with reference to FIG. 6 hereinafter. The multilayer body is preferably formed by performing stacking, press-contacting, and firing of the substrate layers 41a to 41j which are made from dielectric or magnetic materials. However, the substrate layers forming the multilayer body are not necessarily made from ceramic materials. The substrate layers may be, for example, made from a thermoplastic resin, such as polyimide or a liquid crystal polymer, or a thermosetting resin, such as an epoxy resin.

On the back side of the lowest substrate layer 41a, the electrodes P1 to P6 are provided, and on the front side capacitor electrodes C1a-1 and C1b-1 are provided. On the front side of the substrate layer 41b, capacitor electrodes C1a-2 and C1b-2 are provided. On the front sides of the substrate layers 41c to 41i, conductor patterns L1a-1 to L1a-4, L1b-1, L2-1 to L2-6, L3-1 to L3-7, L4-1 to L4-6, 42 and 43 are provided. On the front side of the highest substrate layer 41j, the electrodes I/Oa, I/Ob, CLOCK, VDD, DATA, and GND are provided. Furthermore, on each of the substrate layers 41a to 41j, via-hole conductors are provided to connect various electrodes and conductor patterns through the layers.

By stacking the above-mentioned substrate layers 41a to 41j, the inductance elements L1a, L1b, L2, L3, and L4, and the capacitor elements C1a and C1b are configured, and the circuit illustrated in FIG. 2 is provided. The conductor pattern 42 provided on the substrate layer 41i defines and serves as a data line.

A radio IC device and a radio communication terminal according to the present invention are not limited to the foregoing preferred embodiments. Various changes may be made to the present invention within the scope of the gist of the present invention.

For example, a circuit element which includes an impedance matching circuit may be configured as a substrate on which a radio IC element is mounted. However, the circuit element may be a rewiring layer provided on a functional side of a radio IC element. That is, a radio IC device according to a preferred embodiment of the present invention may be configured as a so-called chip-size package.

As described above, various preferred embodiments of the present invention are useful for a radio IC device and a radio communication terminal, and in particular, preferred embodiments of the present invention are excellent in eliminating exerting adverse effects on communication characteristics of an antenna.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A radio IC device comprising:
   a radio IC element including an antenna terminal connected to an antenna element, and a ground terminal connected to a ground conductor; and
   a circuit board including a circuit element that includes an impedance matching circuit connected to the antenna terminal of the radio IC element; wherein
   a portion of the ground conductor defines the antenna element, and the antenna terminal of the radio IC element is connected to the ground conductor via the impedance matching circuit; and
   the circuit board further includes an inductance element that is provided separately from the impedance matching circuit and that is connected, as a high-frequency cutoff circuit for the radio IC element, between the ground conductor and the ground terminal.

2. The radio IC device according to claim 1, wherein the circuit board is defined by a multilayer body including a plurality of stacked substrate layers.

3. The radio IC device according to claim 1, wherein the impedance matching circuit is defined by another inductance element, and the inductance element and the another inductance element are not coupled to each other or are substantially not coupled to each other.

4. The radio IC device according to claim 1, wherein the impedance matching circuit is defined by another inductance element, each of the inductance element and the another inductance element includes a coil, and winding axes of the coils of the inductance element and the another inductance element are arranged in different positions.

5. The radio IC device according to claim 1, wherein the impedance matching circuit is defined by another inductance element, each of the inductance element and the another inductance element includes a coil, and winding axes of the coils of the inductance element and the another inductance element do not overlap in a plan view.

6. A radio IC device comprising:
   a radio IC element including an antenna terminal connected to an antenna element, and a wired connection terminal connected to a different IC element by a wire; and
   a circuit board including a circuit element that includes an impedance matching circuit connected to the antenna terminal of the radio IC element; wherein
   the different IC element is connected to a ground conductor;
   a portion of the ground conductor defines the antenna element, and the antenna terminal of the radio IC element is connected to the ground conductor via the impedance matching circuit; and
   the circuit board further includes an inductance element that is provided separately from the impedance matching circuit and that is connected, as a high-frequency cutoff circuit for the radio IC element, between the different IC element and the wired connection terminal.

7. The radio IC device according to claim 6, wherein the circuit board is defined by a multilayer body including a plurality of stacked substrate layers.

8. The radio IC device according to claim 6, wherein the impedance matching circuit is defined by another inductance element, and the inductance element and the another inductance element are not coupled to each other or are substantially not coupled to each other.

9. The radio IC device according to claim 6, wherein the impedance matching circuit is defined by another inductance element, each of the inductance element and the another inductance element includes a coil, and winding axes of the coils of the inductance element and the another inductance element are arranged in different positions.

10. The radio IC device according to claim 6, wherein the impedance matching circuit is defined by another inductance element, each of the inductance element and the another inductance element includes a coil, and winding axes of the coils of the inductance element and the another inductance element do not overlap in a plan view.

11. The radio IC device according to claim 6, wherein the inductance element is connected to a ground electrode of the radio IC element.

12. The radio IC device according to claim 6, wherein the inductance element is connected to a power supply electrode of the radio IC element.

13. The radio IC device according to claim 6, wherein the inductance element is connected to a clock electrode of the radio IC element.

14. A radio communication terminal comprising:
    a radio IC device; and
    a mother board including a ground conductor and an antenna element; wherein
    the radio IC device includes a radio IC element that includes an antenna terminal connected to the antenna element and a wired connection terminal connected to a different IC element by a wire, and a circuit board including a circuit element that includes an impedance matching circuit connected to the antenna terminal of the radio IC element;
    the different IC element is connected to the ground conductor;
    a portion of the ground conductor defines the antenna element, and the antenna terminal of the radio IC element is connected to the ground conductor via the impedance matching circuit; and
    the circuit board further includes an inductance element that is provided separately from the impedance matching circuit and that is connected, as a high-frequency cutoff circuit for the radio IC element, between the different IC element and the wired connection terminal.

15. The radio communication terminal according to claim 14, wherein the circuit board is defined by a multilayer body including a plurality of stacked substrate layers.

16. The radio communication terminal according to claim 14, wherein the inductance element is connected to a ground electrode of the radio IC element and the ground conductor.

17. The radio communication terminal according to claim 14, wherein the inductance element is connected to a power supply electrode of the radio IC element and a power supply element provided on the mother board.

18. The radio communication terminal according to claim 14, wherein the inductance element is connected to a clock electrode of the radio IC element and a host IC provided on the mother board.

19. The radio communication terminal according to claim 14, wherein the inductance element is connected to a data electrode of the radio IC element and a host IC provided on the mother board.

20. A radio communication terminal comprising:
    a radio IC device; and
    a mother board including a ground and an antenna element; wherein
    the radio IC device includes a radio IC element including an antenna terminal connected to an antenna element, a ground terminal connected to a ground conductor, and a circuit board including a circuit element that includes an impedance matching circuit connected to the antenna terminal of the radio IC element;

a portion of the ground conductor defines the antenna element, and the antenna terminal of the radio IC element is connected to the ground conductor via the impedance matching circuit; wherein the circuit board further includes an inductance element that is provided separately from the impedance matching circuit and that is connected, as a high-frequency cutoff circuit for the radio IC element, between the ground conductor and the ground terminal.

\* \* \* \* \*